(12) United States Patent
Wawrzola et al.

(10) Patent No.: US 11,614,200 B2
(45) Date of Patent: Mar. 28, 2023

(54) AUTOMATIC LUBRICATION SYSTEM FOR LUBRICATING AN OBJECT

(71) Applicant: Dodge Industrial, Inc., Oxford, CT (US)

(72) Inventors: Grzegorz Wawrzola, Kielce (PL); Daniel Lewandowski, Cracow (PL); Eric Lambert, Central, SC (US); Piotr Ryba, Humniska (PL); Greg Hewitt, Taylors, SC (US); Artur Rdzanek, Simpsonville, SC (US)

(73) Assignee: Dodge Industrial, Inc., Oxford, CT (US)

( * ) Notice: Subject to any disclaimer, the term of this patent is extended or adjusted under 35 U.S.C. 154(b) by 412 days.

(21) Appl. No.: 16/730,195

(22) Filed: Dec. 30, 2019

(65) Prior Publication Data
US 2021/0199241 A1 Jul. 1, 2021

(51) Int. Cl.
*F16N 7/14* (2006.01)
*F16N 29/04* (2006.01)

(52) U.S. Cl.
CPC ............. *F16N 7/14* (2013.01); *F16N 29/04* (2013.01); *F16N 2250/00* (2013.01); *F16N 2270/70* (2013.01)

(58) Field of Classification Search
CPC ............................. F16N 7/14; F16N 2270/70
See application file for complete search history.

(56) References Cited

U.S. PATENT DOCUMENTS 3,267,371 A 8/1966 Greve
6,216,822 B1 4/2001 May et al.
(Continued)

FOREIGN PATENT DOCUMENTS

CN 208457553 2/2019
DE 102011053027 2/2013
KR 1020150117158 10/2015

OTHER PUBLICATIONS

International Search Report and Written Opinion, Counter PCT Appln. No. PCT/US20/67331, dated Mar. 26, 2021, 11 pgs.
International Search Report and Written Opinion, PCT Appln. No. PCT/US20/67330, dated Mar. 26, 2021, 8 pgs.
(Continued)

*Primary Examiner* — Michael R Mansen
*Assistant Examiner* — Mark K Buse
(74) *Attorney, Agent, or Firm* — Robinson & Cole LLP (57) ABSTRACT

An automatic lubrication system for lubricating an object is provided, which includes a lubricant container configured to contain a lubricant and including a rotatable shaft with a piston to dispense the lubricant from an output of the lubricant container, a housing with a coupling section coupled with the lubricant container, an electric motor configured to drive the rotatable shaft of the lubricant container during at least one lubrication action, such that at least a part of the lubricant is dispensable from the lubricant container during the at least one lubrication action, at least one capacitive sensor including at least one electrode, wherein the at least one capacitive sensor is arranged at a wall of the lubricant container and configured to provide at least one sensor signal indicative of a capacitance in a vicinity of the at least one electrode, and a control circuitry configured to determine, based on the at least one sensor signal of the at least one capacitive sensor, at least one lubrication parameter indicative of the at least one lubrication action.

34 Claims, 4 Drawing Sheets

(56) References Cited

U.S. PATENT DOCUMENTS

| | | | |
|---|---|---|---|
| 6,761,067 B1* | 7/2004 | Capano | G01F 23/265 |
| | | | 73/304 C |
| 8,810,260 B1* | 8/2014 | Zhou | G01F 23/265 |
| | | | 73/304 C |
| 9,587,534 B2* | 3/2017 | Bradford | G01F 23/268 |
| 2003/0076119 A1 | 8/2003 | Horz et al. | |
| 2004/0099483 A1 | 5/2004 | Song | |
| 2005/0172712 A1* | 8/2005 | Nyce | G01F 23/268 |
| | | | 73/304 C |
| 2006/0114007 A1* | 6/2006 | Cho | G01N 33/2888 |
| | | | 324/698 |
| 2007/0114834 A1 | 6/2007 | Matzan | |
| 2007/0144834 A1* | 6/2007 | Matzan | H02K 35/02 |
| | | | 184/37 |
| 2008/0271949 A1 | 11/2008 | Tokuyama et al. | |
| 2011/0153094 A1 | 6/2011 | Botha | |
| 2011/0253481 A1* | 10/2011 | Lin | F16N 11/08 |
| | | | 184/108 |
| 2015/0362350 A1* | 12/2015 | Miller | G01F 23/0007 |
| | | | 73/290 R |
| 2016/0369782 A1* | 12/2016 | Lee | F16N 31/00 |
| 2017/0089236 A1* | 3/2017 | Andersen | G01N 33/2888 |
| 2018/0266873 A1* | 9/2018 | Goodier | F01M 11/12 |
| 2021/0102664 A1* | 4/2021 | Wawrzola | F16N 11/08 |
| 2021/0199240 A1 | 7/2021 | Wawrzola et al. | |
| 2021/0199242 A1* | 7/2021 | Wawrzola | F16N 29/02 |

OTHER PUBLICATIONS

International Search Report and Written Opinion, PCT Appln. No. PCT/US20/67328, dated Mar. 26, 2021, 10 pgs.

* cited by examiner

AUTOMATIC LUBRICATION SYSTEM FOR LUBRICATING AN OBJECT

TECHNICAL FIELD

The present invention relates to an automatic lubrication system for lubricating an object. Further, the present invention relates to a method of operating such lubrication system, a computer program, and a non-transitory computer-readable medium storing such computer program.

TECHNICAL BACKGROUND

Automatic lubricators, lubrication devices, lubrication apparatuses and/or lubrication systems are usually used for ensuring a smooth and reliable operation of an apparatus, engine, device and/or industrial system by lubricating one or more objects, parts, portions and/or members thereof. Such objects, parts, portions and/or members can, for example, be and/or comprise a bearing, a shaft or the like.

Generally, an automatic lubrication system can automatically apply lubricant onto and/or into the object that should be lubricated during one or more lubrication actions, e.g. at a specified lubrication time, with a certain lubrication frequency and/or in certain lubrication time intervals. This can render a manual application of the lubricant unnecessary and hence allow to reduce maintenance effort and costs. Therein, a selection of an appropriate lubricant and/or time of lubrication can prevent a failure of the object, the apparatus, engine, device and/or the industrial system, thereby allowing to extend the lifetime thereof.

SUMMARY

According to the present disclosure, there is provided an improved lubrication system that provides improved and/or enhanced functionality, e.g. in terms of reliably, quickly, efficiently and/or accurately determining one or more lubrication parameters.

This is achieved by the subject matter of the independent claims, wherein further embodiments are incorporated in the dependent claims, the following description and the appended figures.

According to a first aspect of the present disclosure, there is provided an automatic, automated and/or at least partly automated lubrication system for lubricating an object. Generally, the lubrication system may refer to a lubrication device and/or a lubrication apparatus configured to apply lubricant onto and/or into at least a part of the object. The lubrication system comprises a lubricant container configured to contain and/or containing a lubricant, wherein the lubricant container includes a rotatable shaft with a piston to dispense the lubricant from an output and/or outlet of the lubricant container. The lubrication system further comprises a housing with a coupling section coupled with and/or coupled to the lubricant container, and an electric motor configured to drive the rotatable shaft of the lubricant container during at least one lubrication action, such that at least a part of the lubricant is dispensable, can be dispensed and/or is dispensed from the lubricant container and/or the output thereof during the at least one lubrication action. The lubrication system further comprises at least one capacitive sensor (also referred to as capacitance sensor and/or sensor hereinafter), which sensor includes at least one electrode, wherein the at least one capacitive sensor is arranged at, mounted at and/or attached to a wall of the lubricant container and configured to provide at least one sensor signal indicative, representative and/or descriptive of a capacitance in a vicinity of the at least one electrode. Further, the lubrication system comprises a control circuitry configured to determine and/or monitor, based on the at least one sensor signal of the at least one capacitive sensor and/or based on processing the at least one sensor signal, at least one lubrication parameter indicative, representative and/or descriptive of the at least one lubrication action. Therein, the control circuitry may be configured to derive the at least one lubrication parameter from the at least one sensor signal of the at least one capacitive sensor and/or to convert the at least one sensor signal into the at least one lubrication parameter.

As will be further described in the following, by means of the at least one capacitive sensor and/or the sensor signal that is indicative of the capacitance in the vicinity of the at least one electrode, one or more lubrication parameters can be reliably, fast, efficiently, cost-efficiently and accurately determined. Further, by arranging the capacitive sensor on the wall of the lubricant container, the determination of the at least one lubrication parameter is robust, e.g. against mechanical influences, such as vibration, shocks, movements or the like. The lubrication system can be used with different containers and/or different types of containers, which may for example differ in size, geometry, shape, volume of lubricant contained therein, or the like. Further, the at least one lubrication parameter, such as e.g. an amount or level of lubricant inside the container, can be determined with high precision even in case of re-using a partially discharged container with the lubrication system, as the capacitive sensor attached to the wall of the container may provide for an accurate determination of the at least one lubrication parameter independent of and/or irrespective of a history of lubrication actions, which would otherwise e.g. have to be stored in a data storage or memory of the lubrication system.

Here and in the following, the "object" can refer to any part, portion and/or member that should be lubricated. For instance, the object can refer to a movable part of an apparatus, device, system and/or industrial system, such as e.g. a motor, an engine or the like. Such a movable part can, for example, be a bearing, a shaft, a drive shaft or the like.

In the context of the present disclosure the at least one capacitive sensor may refer to a dedicated sensor for determining, measuring, monitoring and/or detecting the capacitance in the vicinity of the at least one electrode. It should be noted that the capacitance sensor may comprise one or more electrodes, wherein each of the electrodes may be arranged at, mounted, attached and/or fixed to the wall of the container. For instance, the capacitive sensor may comprise an arrangement of electrodes, an array of electrodes and/or a plurality of electrodes arranged in a pattern and/or at different locations with respect to each other on the wall of the container. Therein, the capacitive sensor and/or the one or more electrodes may be arranged at, mounted, attached and/or fixed to an outer wall of the container or to an inner wall of the container. Further, the one or more electrodes of the capacitive sensor may be arranged on a substrate, e.g. a flexible substrate, such as a flexible printed circuited board.

Further, the sensor signal indicative of the capacitance in a vicinity of the at least one electrode may be indicative of and/or correlate with a capacitance and/or a capacitance value between the at least one electrode and another part of the lubrication system acting as further electrode. For instance, the capacitance in the vicinity of the at least one electrode may refer to a capacitance between the at least one electrode and the rotatable shaft, which may e.g. be made of metal and/or which may be on a reference potential, such as for instance ground potential. Alternatively or additionally the capacitance in the vicinity of the at least one electrode may refer to a capacitance between the at least one electrode and a lateral surface of the piston, which may comprise metal and/or which may act as another electrode. Alternatively or additionally, the capacitive sensor may comprise a plurality of electrodes arranged on the wall of the container at different locations with respect to each other. Accordingly, the at least one capacitive sensor may be configured to provide a plurality of sensor signals, each being indicative of a capacitance in a vicinity of at least one electrode of the plurality of electrodes. Therein, "the capacitance in the vicinity of an electrode" may refer to a capacitance and/or capacitance value between two electrodes of the plurality of electrodes, e.g. two directly neighboring and/or adjoining electrodes, and/or to a capacitance and/or capacitance value between one of the electrodes and another part of the lubrication system acting as further electrode, such as e.g. the rotatable shaft and/or a lateral surface of the piston. Alternatively or additionally, the capacitance in the vicinity of one of the electrodes may refer to a capacitance and/or capacitance value between said electrode and a reference electrode of the plurality of electrodes, which may e.g. be on a reference potential, such as for instance ground potential.

By way of example, a plurality of electrodes may be arranged in a row substantially parallel to the rotatable shaft. Alternatively or additionally, a plurality of electrodes may be arranged, e.g. in juxtaposition and/or displaced relative to each other, along at least a part of a perimeter of the container. Alternatively or additionally, the electrodes might differ in length, width, shape and/or their placement relative to each other and/or to end of the housing.

Moreover, by way of example, a (first) electrode can be arranged on the (inner or outer) wall (and/or surface) of the container and may have an irregular and/or non-rectangular shape with a width of the electrode and/or a dimension measured along the perimeter of the container may change along the length of the container. For instance, the electrode may have a V-shape, a trapezoidal shape and/or a triangular shape, e.g. with the tip being directed towards the output of the container. Optionally, a second electrode may be mounted on a lateral surface of the piston or may be formed and/or provided by the piston. When the piston moves down, an active area of the first electrode may change and by that the determined capacitance and/or capacitance value may change. This may allow to reliably detect the one or more lubrication parameters.

Further, by way of example, on the (outer or inner) surface of the container, multiple electrodes of different lengths may be arranged, such that the ends of the multiple electrodes, which are directed towards the output of the container, are spaced apart from the output by different distances. Alternatively or additionally multiple electrodes may be located at different positions along the length of the container, such that the ends of the multiple electrodes, which are directed towards the output of the container, are spaced apart from the output by different distances. When the piston moves down, the number of the electrodes which are arranged opposite to the piston, and hence which see the piston as second electrode, may change. This may allow to reliably detect the one or more lubrication parameters.

As the level or amount of lubrication in the container changes, the capacitance in the vicinity of the at least one electrode changes due to differences in the electrical permittivity of the material located near and/or close to said electrode, such as e.g. air and the lubricant in the container. Accordingly, the capacitance and/or capacitance value between one of the one or more electrodes and another part of the lubrication system, such as e.g. the rotatable shaft, between one of the one or more electrodes and a reference electrode and/or between one or more pairs of (e.g. directly neighboring) electrodes may change due to differences in the electrical permittivity of the material located near and/or close to the respective one or more electrodes and/or pairs of electrodes.

According to an embodiment, as the level or amount of lubricant in the container changes, the piston position changes in relation to the at least one sensor, and the capacitance between the at least one electrode and the piston changes due to changes of the width of the at least one electrode along the length of the container.

In this context, it should be noted, e.g. when a second electrode is arranged on lateral surface of the piston and the piston moves down, an area and/or surface of the first electrode arranged on the wall of the container, the number of electrodes arranged on the wall of the container, and/or various electrodes placed one under another on the container wall, which create a capacitor with the piston's lateral surface (or the electrode placed thereon) may change along a length of the container, and thus the capacitance may be changing as well. This may allow to reliably detect the one or more lubrication parameters.

Moreover, a length of the at least one capacitive sensor may substantially correspond to a height of the container, wherein the length of the sensor and the height of the container may be measured in a direction parallel to the rotatable shaft. Alternatively, a length of the at least one capacitive sensor may substantially correspond to a circumference and/or perimeter of at least a part of the container measured along a circumferential direction of the at least part of the container.

The coupling section of the housing can be configured for being coupled to the lubricant container or at least a part thereof. For instance, the coupling section of the housing can be configured for being detachably attached and/or mechanically coupled to the lubricant container. Alternatively or additionally, the coupling section can be configured for engaging with at least a part of the lubricant container. The lubricant container and the coupling section may, for instance, be coupled via a threaded coupling or any other suitable coupling allowing to attach and/or detach the container to the housing.

The lubricant container (also referred to as "container") can refer to any type of container, cartridge, can and/or tank configured to store and/or contain a lubricant. The rotatable shaft of the container can, for example, refer to a rotatable screw. The piston of the container can be displaceably arranged on, attached to and/or mounted to the rotatable shaft of the lubricant container. By rotation of the rotatable shaft, the piston can be moved and/or displaced along the rotatable shaft, e.g. in direction towards the output and/or outlet of the container, such that lubricant can at least partly be pushed and/or moved by the piston out of the output of the container to lubricate the object.

The electric motor can be an arbitrary type of electric motor, such as e.g. a DC motor, an AC motor, a brushed motor or a brushless motor. The electric motor can be supplied with electrical power by a power supply of the lubrication system. The power supply can be connected to a supply grid or it can comprise one or more batteries and/or accumulators.

The control circuitry may refer to a control circuit, a controller and/or a control unit configured to actuate and/or control the electric motor. Therein, at least a part of the control circuitry may for example be arranged on a printed circuit board. The control circuitry may be coupled to the electric motor by one or more electric lines. The control circuitry may be configured to switch-on the electric motor. For instance, the control circuitry may switch-on the electric motor by activating the power supply for supplying electrical power to the electric motor and/or by coupling the electric motor to the power supply, e.g. based on actuating a switch arranged in a supply line connecting the power supply and the electric motor. Further, the control circuitry may be configured to switch-off the electric motor. The electric motor may be switched-off by the control circuitry e.g. by deactivating the power supply and/or by decoupling the electric motor from the power supply.

Further, the lubrication system can comprise a data storage and/or data storage device. The data storage may be part of and/or may be coupled to the control circuitry. The control circuitry may further comprise one or more processors, e.g. one or more microcontrollers or the like. The data storage may store software instructions and/or a computer program, which, when executed by the one or more processors of the control circuitry instructs the lubrication system to perform the functional features and/or functionalities described above and in the following with reference to the lubrication system.

In the context of the present disclosure the term "lubrication action" may refer to a state of the lubrication system, in which the electric motor is actuated by the control circuitry, supplied with electrical power, powered and/or driven by electrical power. Accordingly, the lubrication action may refer to and/or be indicative of a time period and/or a lubrication time period, during which the electric motor is actuated by the control circuitry, supplied with electrical power, powered and/or driven with electrical power by the control circuitry (and/or the power supply). During the lubrication action, a certain amount of lubricant may be dispensed by the lubrication system. Depending on a condition or state of the lubricant container, such as e.g. a blockage of the output, however, dispensing of lubricant may be (partly or completely) blocked, although the electric motor is actuated and/or powered. Accordingly, the term "lubrication action" can be accompanied by and/or result in dispensing a certain amount of lubricant or it can be accompanied by and/or result in powering the electric motor without dispensing lubricant, e.g. in the case of a complete blockage of the output. Both scenarios are referred to as lubrication action in the present disclosure. In other words, a lubrication action may comprise dispensing of lubricant and may comprise a lubrication attempt, during which the electric motor is actuated, but no lubricant can be dispensed, e.g. because of an output blockage, because the lubricant container is empty, because of a malfunction of the container, because of an erroneous coupling of the container to the coupling section, because no lubricant container is coupled to the coupling section or the like. Further, the term at least part of the lubrication action may refer to a partial or the entire time period of the lubrication action (and/or lubrication time period.

In the context of the present disclosure, the at least one lubrication parameter is indicative of, representative of and/or descriptive of the at least one lubrication action. Therein, the at least one lubrication parameter may, generally, refer to an operational parameter or parameter descriptive, representative, and/or indicative of an operation of the lubrication system and/or an operation of at least a part of the lubrication system, such as e.g. the electric motor.

Alternatively or additionally, the at least one lubrication parameter may be descriptive, representative, and/or indicative of a status, a state, a condition and/or a working condition of the lubrication system and/or at least a part thereof, such as e.g. an idle state, a running state, a normal working condition and/or an abnormal working condition. Alternatively or additionally, the at least one lubrication parameter may refer to an operational parameter descriptive, representative, and/or indicative of an operation of the container and/or an operation of at least a part of the container, such as e.g. a rotation of the rotatable shaft, a movement of the rotatable shaft, a displacement of the piston and/or a movement of the piston. Moreover, the at least one lubrication parameter may be indicative of, descriptive of and/or representative of a state, a status and/or a condition of the lubricant container, such as e.g. an amount of lubricant contained and/or remaining in the container.

Generally, the present invention may be considered as being based on the following insights and findings. It may be desirable to increase an efficiency and reliability of an object and/or a system or apparatus comprising the object, such as e.g. an industrial system. Preferably, an automatic lubrication system should be able to detect, determine and/or monitor one or more lubrication parameters, such as e.g. an amount of lubricant dispensed from the lubrication system and/or from the container during one or more lubrication actions, a level of lubricant remaining in the container, a level of lubricant contained in the container, an error, a failure, a malfunction, and/or an abnormal work condition of the lubrication system (and/or of the container). Such abnormal working condition can for example be a lubricant container output blockage, which may prevent proper dispensing of the lubricant from the container and could lead to insufficient lubrication of the object. Determining the one or more lubrication parameters may, for example, prevent a situation which could possibly adversely affect the object and/or the system or apparatus comprising the object. In turn, this could shorten a lifetime of the object and/or the system or apparatus comprising the object.

The control circuitry may be configured to determine and/or monitor, based on the one or more sensor signals and/or based on processing the one or more sensor signals, the capacitance, capacitances, capacitance value and/or capacitance values in the vicinity of the one or more electrodes. By determining and/or monitoring the capacitance(s) and/or capacitance value(s) in the vicinity of the one or more electrodes, in accordance with the lubrication system of the present invention, the one or more lubrication parameters can be determined and/or monitored, because the capacitance(s) in the vicinity of the one or more electrodes is dependent on the electrical permittivity of the material in the vicinity of the respective electrode and/or an area of the electrode which might vary along the length of the container. In particular, the one or more lubrication parameters can be determined and/or monitored in a reliable, fast, efficient, cost-efficient and accurate manner, independent on other work conditions, such as e.g. vibration, moisture and/or temperature. In other words, a reliable detection and/or monitoring of the lubrication parameter(s) that is independent on environmental conditions, such as e.g. vibration, moisture and/or temperature at the site of the lubrication system, can be ensured by the lubrication system according to the present disclosure.

According to an embodiment, the control circuitry may be configured to determine and/or monitor the position of the piston relative to the one or more sensor, based on the one or more sensor signals and/or based on processing the one or more sensor signals, the capacitance, capacitances, capacitance value and/or capacitance values between the one or more electrodes and the piston. By determining and/or monitoring the capacitance(s) and/or capacitance value(s) between the one or more electrodes and the piston, in accordance with the lubrication system of the present invention, the position of the piston relative to the container output might be monitored. Further, based on the position of the piston, the one or more lubrication parameters can be determined and/or monitored, because the capacitance between the one or more electrodes and the piston is dependent on the position of the piston relative to the one or more electrodes, and the amount of the lubricator remaining in the container may be determined basis on the piston position in relation to the sensor.

Therein, the term "monitoring" of the capacitance(s) and/or capacitance value(s) and/or the at least one lubrication parameter may mean determining the capacitance(s), capacitance value(s) and/or the at least one lubrication parameter over time, e.g. continuously or in certain time intervals.

Further, the lubrication system may be very robust against vibration, shocks and/or other mechanical influences or movements as the at least one capacitance sensor is (e.g. directly) attached to the lubricant container and in case of any movement of the container the sensor moves in correspondence thereto and is always at the same position relative to the wall of the container. Also, a partially discharged container may be re-used, as the capacitive sensor attached to the wall of the container may allow for an accurate determination of the lubrication parameter(s), such as e.g. the level or amount of lubricant in the container, such that an assessment of the at least one lubrication parameter may be independent on previous lubrication actions and/or a history of lubrication.

According to an embodiment, the at least one lubrication parameter is indicative of at least one of an abnormal working condition of the lubrication system, an abnormal working condition of the lubricant container, a blockage of the output of the lubricant container, an amount of lubricant dispensed during at least a part of the at least one lubrication action, an accumulated amount of lubricant dispensed from the lubricant container in a plurality of lubrication actions, an amount of lubricant remaining in the lubricant container, a lubrication time period for the at least one lubrication action, a lubrication frequency, and a time (or time period) between consecutive lubrication actions. Accordingly, based on the sensor signal of the at least one sensor, one or more lubrication parameters providing information about the lubrication action(s) and/or the condition of the lubrication system and/or the condition of the container can be determined. Therein, one lubrication parameter can be derived from another lubrication parameter. For instance, the amount of lubricant dispensed during the at least one lubrication action actually performed can be determined and added to an amount of lubricant dispensed during one or more previous lubrication actions in order to determine the accumulated amount of lubricant. This can allow to derive comprehensive information about the lubrication action, the lubrication system and/or the container based on the at least one sensor signal and/or based on processing the at least one sensor signal.

In the context of the present disclosure, the abnormal working condition of the container and/or the lubrication system may refer to a working condition, in which an actual amount of lubricant dispensed during the lubrication action differs from a pre-defined and/or target amount of lubricant, e.g. an amount that should be dispensed during the lubrication action. This can comprise dispensing more lubricant as well as less lubricant than the pre-defined amount of lubricant. For instance, the output and/or outlet of the container may be completely or partially blocked resulting in a reduction of the actual amount of lubricant dispensed during the lubrication action.

Further, the blockage of the output may refer to a partial blockage or a complete blockage of the output. The lubrication time period may refer to and/or denote the time period of the lubrication action, i.e. the time during which the electric motor is actuated by the control circuitry, is switched-on, powered, driven and/or supplied with electric power by the control circuitry (and/or the power supply). The lubrication time period may be given as the time difference between a termination time of the lubrication action, at which the lubrication action is terminated, and a start time of the lubrication action, at which the lubrication action was started or initiated.

It should be noted that the present disclosure is not limited to the lubrication parameters listed above. Rather, any other lubrication parameter that is determinable based on the at least one sensor signal can alternatively or additionally be determined. For instance, a normal working condition, such as e.g. a condition in which the actual amount of lubricant dispensed matches the pre-defined and/or target amount, and/or a start time of a subsequent lubrication action can be determined based on the at least one sensor signal.

According to an embodiment, the control circuitry is configured to determine the at least one lubrication parameter based on at least one container parameter, wherein the at least one container parameter is indicative, representative and/or descriptive of at least one of a type of the lubricant container, a capacity of the lubricant container, a volume of the lubricant container, an initial volume of lubricant stored in the lubricant container, a geometry of the lubricant container, a shape of the lubricant container, a height of the lubricant container, and a diameter of at least a part of the lubricant container. By way of example, based on the at least one container parameter and based on the at least one sensor signal, the amount dispensed during the lubrication action can be calculated. Further, taking into account an initial volume of lubricant in a container and the actual amount dispensed from said container during the lubrication action (or an accumulated amount of lubricant dispensed during a plurality of lubrication actions), the amount of lubricant remaining in the container after performing the lubrication action can be calculated. Alternatively or additionally, the amount or level of lubricant in the container can be directly determined based on the at least one sensor signal of the at least one capacitive sensor. Also, a lifetime of the container may be determined e.g. based on the frequency of lubrication actions.

According to an embodiment, the at least one capacitive sensor and/or the at least one electrode thereof is arranged at an inner wall or an outer wall of the lubricant container.

Arranging the sensor and/or the electrode on the inner wall and/or in an interior volume of the container, may further increase a robustness of the lubrication system. On the other hand, arranging the sensor and/or the electrode on the outer wall may simplify replacement of the container and/or the capacitive sensor.

According to an embodiment, the at least one capacitive sensor is strip-like formed and extends substantially parallel to the rotatable shaft from an end of housing of the lubrication system towards the output of the lubricant container. The capacitive sensor may comprise a plurality of electrodes which may be arranged in a row at different locations with respect to each other on the wall of the container. Alternatively or additionally, the sensor may comprise a plurality of electrodes which may be arranged in parallel to each other and in parallel to the rotatable shaft, wherein a length of the electrodes and their location in correspondence with an end of the housing and the output of the lubricant container may vary. Such configuration may allow for a reliable determination of the lubrication parameter, irrespective of the actual level or amount of lubricant contained in the container. For example, this allows to determine any amount or level of lubricant in the container, ranging from a completely filled container to a completely empty container.

According to an embodiment, a shape, a size and/or a dimension of the at least one electrode varies along a length of the container. For instance, the at least one electrode may be V-shaped and/or triangular shaped, e.g. with the tip being directed towards the output of the container.

According to an embodiment, the at least one capacitive sensor is detachably attached to the wall of the lubricant container, e.g. by a glue connection. Gluing the sensor to the wall of the container may allow for a robust connection between the sensor and the wall, while also allowing replacement of the container and attachment of the sensor to a further or new container. Accordingly, the sensor may be re-used with a different container. It should be noted that the capacitive sensor can be mounted and/or attached to the container by any other connection, such as e.g. a snap-fit, a weld connection or any other connection.

According to an embodiment, the at least one capacitive sensor at least partly encompasses the container at a perimeter of the container. For instance, the capacitive sensor and/or the one or more electrodes thereof may be arranged on an elastic substrate or support and/or the electrodes may be interconnected by an elastic material. The capacitive sensor may for instance be placed around the container, such that the sensor at least partly or entirely encompasses and/or surrounds the container along the perimeter, along a circumference and/or along a circumferential direction of the container. Due to an astringent force of the elastic substrate or support and/or the elastic material, the capacitive sensor may be fixed and/or held in place on the container. This may render any further connection of the capacitive sensor with the wall of the container, such as e.g. a glue connection, unnecessary. It should be noted, however, that the capacitive sensor may be additionally fixed to the container by a glue connection and/or any other suitable connection.

According to an embodiment, the lubrication system further comprises a protection cover covering at least a part of the at least one capacitive sensor to protect the at least one capacitive sensor. The protective cover may be a layer of any suitable material, such as e.g. plastics, polymer-based material, fabrics, a resin, or the like. Further, the material of the protective cover may be elastic or non-elastic. By means of the protective cover, robustness of the lubrication system can be further enhanced.

According to an embodiment, the protection cover entirely covers the at least one capacitive sensor to protect the at least one capacitive sensor. This may further enhance robustness of the lubrication system.

According to an embodiment, at least a part of the protection cover is arranged at the wall of the lubricant container, such that a compartment is formed between the wall of the lubricant container and the protection cover, wherein the at least one capacitive sensor is arranged in the compartment formed between the wall of the lubricant container and the protection cover. By forming the compartment and arranging the sensor in the compartment, the sensor may be comprehensively protected against moisture, dust, dirt, gases or any other environmental influence. For instance, edges and/or borders of the protective cover may be attached to the wall of the container, wherein a middle region of the protective cover may be spaced apart from the wall, thereby forming the compartment, in which the capacitive sensor may be arranged.

According to an embodiment, the lubrication system further comprises a sensor connector arranged adjacent the coupling section of the housing at a wall of the housing, wherein the at least one capacitive sensor is detachably coupled to the sensor connector. Therein, the sensor connector may be arranged and/or located at an outer wall or an inner wall of the housing. Via the sensor connector, the at least one sensor may be electrically coupled to the control circuitry and/or a power supply.

According to an embodiment, the sensor connector is electrically coupled to the at least one capacitive sensor and to the control circuitry. Accordingly, via the sensor connector, electrical signals, including the one or more sensor signal, may be transmitted from the sensor to the control circuitry. Vice versa, electrical signals, e.g. control signals, may be transmitted from the control circuitry to the sensor via the sensor connector.

According to an embodiment, the control circuitry comprises a measurement circuitry configured to determine, based on the at least one sensor signal, at least one capacitance value of the capacitance in the vicinity of the at least one electrode. Generally, the at least one capacitance value may be a capacitance value between said at least one electrode and another part of the lubrication system, such as e.g. the rotatable shaft and/or a lateral surface of the piston, between said at least one electrode and another electrode, and/or between said at least one electrode and a reference electrode. Further, by detecting, measuring and/or monitoring the capacitance value by the at least one electrode and the lateral surface of the piston, the position of the piston relative to the sensor and/or the container may be determined.

Therein, the measurement circuitry may be configured to determine the at least one capacitance value of the at least one electrode based on applying a known charge to said electrode and measuring a potential, based on applying a known potential to said electrode and measuring a charge of the electrode (e.g. based on integrating the current supplied to the electrode over time), based on constructing an oscillating circuit comprising said electrode, whereby the frequency or resonance frequency of that circuit may depend on the capacitance value, and measuring the frequency or resonance frequency and/or whereby a correlation between current and voltage at a given frequency may depend on the capacitance value. In another example implementation, the measurement circuitry may comprise a capacitance bridge configured to measure the capacitance value of said electrode.

According to an embodiment, the measurement circuitry is arranged on or integrated in a printed circuit board of the control circuitry. In other words, the control circuitry and the measurement circuitry may be arranged on a common printed circuit board. This may allow to design the lubrication system in a compact manner.

According to an embodiment, the at least one capacitive sensor comprises a plurality of electrodes, wherein the at least one sensor signal is indicative of a capacitance and/or a capacitance value between at least two electrodes of the plurality of electrodes. For instance, the at least one sensor signal may be indicative of capacitance and/or capacitance value of two directly neighboring and/or adjoining electrodes of the plurality of electrodes.

According to an embodiment, the control circuitry is configured to determine and/or monitor, based on the at least one sensor signal of the at least one sensor, an amount or level of lubricant contained in the lubricant container.

According to an embodiment, the control circuitry is configured to determine and/or monitor, based on the at least one sensor signal of the at least one sensor, a first amount of lubricant contained in the lubricant container before performing and/or initiating the lubrication action and a second amount of lubricant contained in the lubricant container after performing at least a part of the lubrication action or the entire lubrication action, wherein the control circuitry is configured to determine an amount of lubricant dispensed from the lubricant container during and/or in the at least part of the lubrication action or the entire lubrication action based on the determined first amount and the second amount. By determining the amount of lubricant contained in the container before and after the at least part of or the entire lubrication action, the actually dispensed amount of lubricant, i.e. the amount of lubricant dispensed in the at least part or the entire lubrication action, can be determined. Further, determining the amount of lubricant dispensed during the at least part or the entire lubrication may allow to ensure that the object is sufficiently lubricated and/or may allow calculation and/or determination of the amount of lubricant remaining in the container.

According to an embodiment, the control circuitry is configured to monitor, based on the sensor signal of the at least one sensor, an amount of lubricant dispensed from the lubricant container in one or more lubrication actions, wherein the control circuitry is configured to compare the determined amount of lubricant dispensed in the one or more lubrication actions from the lubricant container with at least one threshold value. Therein, the amount of lubricant dispensed in a plurality of lubrication actions may refer to an accumulated and/or total amount of lubricant dispensed from the container. In other words, the control circuitry may be configured to monitor the amount of lubricant dispensed in a single lubrication and/or dispensed in a plurality of lubrication actions. The one or more threshold values may e.g. be stored in a data storage of the lubrication system. Alternatively or additionally, the one or more threshold values may be retrieved from another source, e.g. via a communication circuitry of the lubrication system.

According to an embodiment, the control circuitry is configured to stop the electric motor when the determined amount of lubricant dispensed from the lubricant container in the one or more lubrication actions reaches or exceeds the at least one threshold value.

For instance, the control circuitry may be configured to determine the amount of lubricant dispensed during a single lubrication action and compare the determined amount with a threshold value for the amount of lubricant that should be dispensed per lubrication action and/or with a target amount of lubricant that should be dispensed per lubrication action. When the control circuitry determines that the amount of lubricant dispensed in the lubrication action reaches or exceeds the threshold value for the amount of lubricant that should be dispensed per lubrication action, the control circuitry stop the electric motor, such that the lubrication action is terminated. This may allow to ensure that the target amount of lubricant is indeed dispensed during the lubrication action, thereby ensuring sufficient and proper lubrication of the object. Optionally, a signal indicating that the target amount of lubricant has been dispensed may be triggered by the control circuitry when the threshold value is reached or exceeded. The signal may e.g. be transmitted via a communication circuitry of the lubrication system.

Alternatively or additionally, the control circuitry may be configured to determine the amount of lubricant dispensed during and/or in a plurality of lubrication actions and compare the determined amount with a threshold value for a maximum amount of lubricant dispensable from the container. Therein, the maximum amount of lubricant may substantially correspond to an initial volume or amount of lubricant stored in the container. When the control circuitry determines that the amount of lubricant dispensed in the plurality of lubrication actions reaches or exceeds the threshold value for the maximum amount of lubricant, the control circuitry may stop the electric motor and/or may determine that the container is nearly empty, close to empty and/or empty. This may allow a reliable determination and/or estimation on when the container is empty. Also, by stopping the electric motor, it may be ensured that the electric motor is not powered and/or driven, when the container is empty. Optionally, a signal indicating that the container is nearly empty, close to empty and/or empty may be triggered by the control circuitry when the threshold value is reached or exceeded. The signal may e.g. be transmitted via a communication circuitry of the lubrication system.

According to an embodiment, the at least one threshold value is at least one of a threshold value for the amount of lubricant that should be dispensed per lubrication action and a threshold value for a maximum amount of lubricant dispensable from the container.

According to an embodiment, the control circuitry is configured to determine, based on the at least one sensor signal, an amount or level of lubricant remaining in the lubricant container, e.g. after performing the lubrication action. The amount or level of lubricant remaining in the container may be determined directly based on the at least one sensor signal. Alternatively, the amount or level remaining in the container may be determined based on subtracting the determined amount of lubricant dispensed during the lubrication action from an initial amount of lubricant stored in the lubricant container before performing the lubrication action.

According to an embodiment, the control circuitry is configured to determine and/or monitor, based on the one or more sensor signals and/or based on processing the one or more sensor signals, a displacement of the piston relative to the at least one sensor and/or the container, wherein the control circuitry is configured to compare the determined displacement of the piston relative to the at least one sensor with at least one threshold value. Therein, the at least one threshold value may refer to a threshold value for the displacement of the piston per lubrication action and/or a threshold value for a maximum displacement of the piston. The one or more threshold values may e.g. be stored in the data storage. Alternatively or additionally, the one or more threshold values may be retrieved from another source, e.g. via a communication circuitry of the lubricator.

Generally, the threshold value for the displacement per lubrication action may correspond to and/or may be indicative of a displacement of the piston during a single lubrication action and/or per lubrication action, which should result in dispensing a pre-defined and/or appropriate amount of lubricant during the lubrication. In other words, the threshold value for the displacement of the piston per lubrication action may be indicative of and/or correlate with a target amount of lubricant that should be dispensed during a single lubrication action. Accordingly, by comparing the determined and/or monitored displacement with the threshold value for the displacement of the piston per lubrication action, it may be ensured that the pre-defined and/or appropriate amount of lubricant has been dispensed during the lubrication action.

Further, the threshold value for the maximum displacement of the piston may be indicative of a position and/or displacement of the piston, when the container is substantially empty. Accordingly, by comparing the displacement of the piston with the threshold value for the maximum displacement, the amount of lubricant remaining in the container can be determined. Alternatively or additionally, it may be determined and/or predicted when the container will be empty. Optionally, upon reaching and/or exceeding the threshold value for the maximum displacement, a signal and/or warning signal may be generated by the control circuitry.

According to an embodiment, the control circuitry is configured to stop the electric motor when the determined displacement of the piston relative to the at least one sensor reaches or exceeds the at least one threshold value, such that the lubrication action is terminated. Therein, the at least one threshold value may refer to a threshold value for the displacement of the piston per lubrication action and/or a threshold value for a maximum displacement of the piston. This way, it may be ensured that the pre-defined and/or appropriate amount of lubricant has been dispensed during the lubrication action. Alternatively or additionally, it may be ensured that the electric motor is not powered or driven when the container is empty and/or the threshold value for the maximum displacement has been reached and/or exceeded.

According to an embodiment, the lubrication system further comprises a communication circuitry configured to transmit a signal indicative of the determined at least one lubrication parameter. The communication circuitry may be a wired communication circuitry or a wireless communication circuitry. By way of example, the signal may be a warning signal indicating a blockage of the output of the container and/or any other lubrication parameter. Alternatively or additionally, the signal may be indicative of the amount of lubricant dispensed during one or more lubrication actions. Alternatively or additionally, the signal may be indicative of the amount of lubricant remaining and/or stored in the container, e.g. after performing a lubrication action. Optionally, such signal may be a warning signal indicating that the remaining lubricant has reached a threshold value and/or that the container is substantially empty. This may allow to indicate to a user that the container should be replaced.

According to an embodiment, the control circuitry is further configured to compare the at least one lubrication parameter with at least one threshold value for the lubrication parameter, wherein the control circuitry is configured to trigger transmission of the signal via the communication circuitry, when the at least one lubrication parameter reaches or exceeds the at least one threshold value for the lubrication parameter.

By means of the communication circuitry, an enhanced functionality of the lubrication system can be provided. For instance, this provides the possibility of setting one or more parameters of the lubrication system and reading one or more sets of data without necessity of dismounting the lubrication system from the lubrication site and even without coming too close to this site, as in many cases the automatic lubrication systems are placed in places with difficult or dangerous access. In such situation the communication circuitry, particularly providing wireless connectivity to the lubrication system, can be advantageous as it can allow to reduce the number of LEDs, displays, switches and buttons mounted on the hardware, and in such a way decrease the cost while improving readability of data exchanged with the lubrication system. For instance, the lubrication system and/or the communication circuitry can comply with at least one wireless communication standard, such as e.g. Bluetooth or W-Fi, so that it can be accessed with a user device like a smartphone or a laptop rather than with a dedicated hardware. Hence, the lubrication system might be able to exchange data, signals and/or commands with an external device, which only needs to be equipped with corresponding software. Also, this can allow to avoid additional costs associated with a dedicated device designed only for communication with the lubrication system. Moreover, a wireless communication can allow for placing the lubrication system in hard-to-reach destinations without necessity of providing cables to connect to the device and change settings or read the data regarding the operation of the lubrication system.

The communication circuitry may be and/or comprise a radio module that can be embedded into the lubrication system, e.g. so that it is protected by the housing against damage, dust and humidity. This can be of particular advantage in an environment with heavy machinery where the lubrication systems are normally placed.

Further, based on the communication circuitry, operation of the lubrication system can be monitored, e.g. without necessity of visual inspection of the lubrication system mounted on a machine. Based on the communication circuitry, a self-monitoring feature, which can e.g. verify the status of the lubrication system, can be implemented. For instance, a notification, a warning, a signal, a warning signal and/or an alarm message can be transmitted via the communication circuitry and/or a corresponding communication interface that is preferably configured for wireless transmission. For instance, this can allow to recognize if the lubrication system is working properly or not, without visual inspection of the lubrication system. Also, a signal regarding the status of the lubrication system and/or the container can be received from the lubrication system, e.g. on an external device.

The self-monitoring feature or functionality of the lubrication system, which can be implemented in the control circuitry, can recognize a situation when an immediate action should be taken and e.g. send an alarm message. Optionally, a failure, e.g. by assessing that the level of the lubricant in the container is coming close to empty, can be predicted and a warning message can be sent before the actual failure occurs. This allows a service action to be planned in advance after the warning has been received.

According to an exemplary embodiment, the control circuitry is further configured to determine, estimate, compute and/or calculate a date, time, time instant and/or time period for a next service action for servicing the lubrication system or at least a part thereof. The date, time, time instant and/or time period can for example be calculated based on monitoring one or more parameters, such as e.g. an amount of lubricant in the lubricant container, and the like. Alternatively or additionally, data and/or information related to one or more lubrication actions performed by the lubrication system in the past and/or scheduled in future can be taken into account. For example, it can be determined how often or frequently lubricant is dispensed, how much lubricant is dispensed in each. This can allow to estimate and/or determine a remaining working time until a next service action, e.g. for a change of the lubricant container, should be carried out. Further, based on such information, the date, time, time instant and/or time period for the next service action can be determined and/or calculated. Therein, determining the date, time, time instant and/or time period may comprise determining a maintenance date for servicing the lubrication system. Further, the determined date, time, time instant, time period and/or maintenance date may be transmitted via the communication circuitry, i.e. over wired or wireless communication interface, to another device which can communicate with the lubrication system, such as e.g. a gateway, a laptop, a smartphone or any other device.

Generally, this can allow to reduce the number of maintenance actions as the exact date and/or time of the next maintenance action can be determined. Prediction of dates when the service should be carried out may further allow to minimize the number of unnecessary maintenance actions and to plan the work of the service team in advance.

A second aspect of the present disclosure relates the use of the lubrication system, as described above and in the following, for lubricating an object.

A third aspect of the present disclosure relates to a method of operating an automatic, automated and/or at least partly automated lubrication system. The method comprises:
actuating, with a control circuitry of the automatic lubrication system, an electric motor of the lubrication system to drive, during at least one lubrication action, a rotatable shaft of the lubricant container and displace a piston of the lubricant container coupled to the rotatable shaft;
generating, with at least one capacitive sensor including at least one electrode and arranged at a wall of the lubricant container, at least one sensor signal indicative of a capacitance in a vicinity of the at least one electrode; and
determining, with the control circuitry of the lubrication system, at least one lubrication parameter indicative of the at least one lubrication action based on the at least one sensor signal of the at least one capacitive sensor.

A fourth aspect of the present disclosure relates to a computer program, which, when executed by one or more processors of a lubrication system, instructs the lubrication system to carry out the steps of the method, as described above and in the following.

A fifth aspect of the present disclosure relates to a non-transitory computer-readable medium storing a computer program, which, when executed by one or more processors of a lubrication system, instructs the lubrication system to carry out the steps of the method, as described above and in the following.

It should be noted that any feature, element, step and/or function described above and in the following with reference to one aspect of the present disclosure equally applies to any other aspect of the present disclosure. Specifically, any feature, element, step, and/or function described above and in the following with respect to the lubrication system equally applies to the method, and vice versa.

Further, it should be noted that any embodiment described hereinabove with reference to one aspect of the present disclosure can be combined with any other embodiment of the same or any other aspect. This may mean that any dependent claim can depend from any of the preceding claims.

These and other aspects of the invention will be apparent from and elucidated with reference to the embodiments described hereinafter.

BRIEF DESCRIPTION OF THE DRAWINGS

In the following, the invention is described with reference to the appended figures which give background explanations and represent exemplary embodiments of the invention.

The figures are schematic only and not true to scale. In principle, identical or like parts, elements and/or steps are provided with identical or like reference symbols in the figures.

DETAILED DESCRIPTION OF EXEMPLARY EMBODIMENTS

Figure 1:
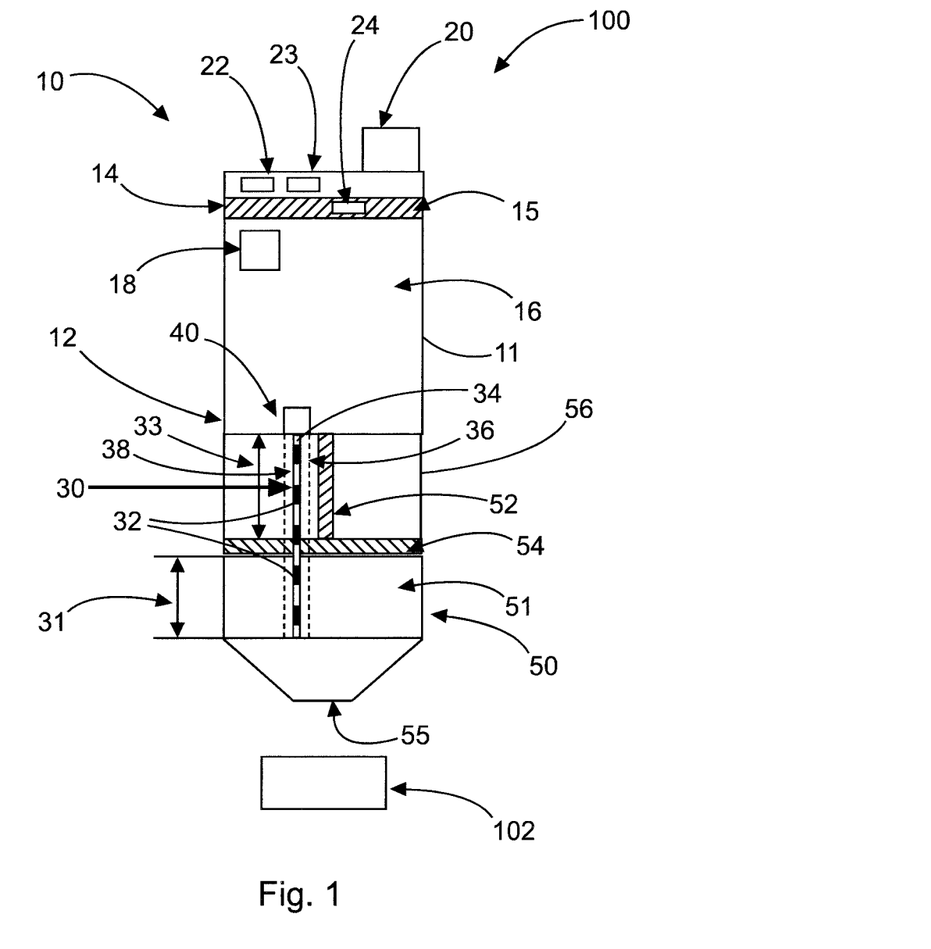
FIG. 1 shows a cross-sectional view of a lubrication system according to an exemplary embodiment.

FIG. 1 shows a cross-sectional view of a lubrication system 100 according to an exemplary embodiment.

The lubrication system 100 comprises a lubricator 10 with a housing 11 having a coupling section 12 which is coupled to a lubricant container 50 of the lubrication system 100. The container 50 can be detachably attached to the lubricator 10 and/or the housing 11 by any suitable connection, such as e.g. a threaded coupling and/or threaded connection.

The lubricant container 50 comprises a rotatable shaft 52 and/or rotatable screw 52, on which a piston 54 is displaceably arranged, mounted and/or attached. Further, the container 50 contains a lubricant 51 which is to be dispensed via an outlet 55 and/or output 55 of the container 50, e.g. during a lubrication action. Upon rotation of the rotatable shaft 52, the piston 54 is displaced in a direction towards the output 55, such that a part of the lubricant 51 is pushed out of the output 55.

For driving the rotatable shaft 52 of the container 50, the lubricator 10 and/or the lubrication system 100 comprises an electric motor 16 and a control circuitry 14 for controlling and/or actuating the electric motor 16. The control circuitry 14 can be arranged at least partly on a Printed Circuit Board 15, PCB, arranged on a top side of the lubricator 10 opposite to the coupling section 12, the container 50 and/or the output 55. The PCB 15, however, can be arranged anywhere else. The electric motor 16 comprises a rotating part (not shown) for driving the rotatable shaft and a static part (not shown). The static or immovable part may e.g. refer to a stator and/or a motor housing of the electric motor 16.

Optionally, the lubricator 10 may comprise a gearbox (not shown) which may be configured to change a rotational speed of the shaft 52 driven by the electric motor 16. For instance, based on the gearbox, the shaft 52 driven by the electric motor 16 via the gearbox, can be operated at a low rotational speed with higher force when the electric motor 16 operates with higher speed and lower force, and vice versa.

The control circuitry 14 is further coupled to a power supply 18, which provides the electrical power for driving the electric motor 16, the rotatable shaft 52 and/or the piston 54. The power supply 18 can comprise one or more batteries. Alternatively or additionally, the power supply 18 may be connected to a supply grid and/or a power supply system.

The lubrication system 100, the lubricator 10 and/or the control circuitry 14 is configured to dispense a certain amount of lubricant 51, e.g. during a lubrication action, onto and/or into an object 102 that is to be lubricated, such as e.g. a part, portion and/or member of an industrial system, an apparatus and/or device. For instance, the object 102 may be a bearing 102.

Further, the lubrication system 100 and/or the lubricator 10 comprises at least one capacitive sensor 30 comprising one or more electrodes 32. The sensor 30 is configured to provide one or more sensor signals indicative of a capacitance in a vicinity of the one or more electrodes 32. In the example shown in FIG. 1, the sensor 30 comprises in total four electrodes 32 arranged in a row on a substrate 34 substantially parallel to the rotatable shaft 52. However, any other number of electrodes 32, such as e.g. two, three, five, six or more, may be used. The substrate 34 may comprise any suitable material, such as for example a plastics material, polymer-based material or the like.

Alternatively, a plurality of electrodes 32 may be arranged in parallel, each of them having a length which substantially corresponds to a length of the container 50. Alternatively, the lengths of the electrodes 32 may vary, as will be described in subsequent figures.

Further, the one or more sensor signals of the plurality of electrodes 32 may be indicative of and/or correlate with a capacitance and/or a capacitance value between each of the electrodes 32 and another part of the lubrication system 100 acting as further electrode, such as e.g. the rotatable shaft 52 and/or the piston 54. Alternatively or additionally, the one or more sensor signals may be indicative of a capacitance and/or capacitance value between two electrodes 32 of the plurality of electrodes 32, e.g. two directly neighboring and/or adjoining electrodes 32, and/or to a capacitance and/or capacitance value between one of the electrodes 32 and a reference electrode of the plurality of electrodes 32, which may e.g. be on a reference potential, such as for instance ground potential.

Generally, as the electrical motor 16 rotates, it rotates the rotatable shaft 52 and moves the piston 54 towards the output 55, thereby pushing lubricant 51 out of the container 50, such that the level or amount of lubricant 51 in the container 50 is decreased. As the level or amount of lubricant 51 in the container 50 changes or decreases, the capacitance in the vicinity of the electrodes 32 changes due to differences or changes in the electrical permittivity of the material located near and/or close to said electrodes 32. In the example shown in FIG. 1, an upper part 33 of the container 50 is empty and/or filled with gas and/or air, and a lower part 31 of the container 50 is filled with lubricant 51. Depending on the material, i.e. air, the lubricant 51 and/or the piston 54, arranged in the vicinity of the electrodes 32, the capacitance in the vicinity of the respective electrodes 32 is changed and/or affected. Accordingly, by determining the capacitances in the vicinity of at least a part of the electrodes 32 of the plurality of electrodes 32, the one or more lubrication parameters can be reliably determined and/or monitored.

Further, the substrate 34, the electrodes 32 and/or the capacitive sensor 30 are arranged at, mounted and/or attached to a wall 56 of the container 50. Therein, the substrate 34, the electrodes 32 and/or the capacitive sensor 30 may be arranged and/or fixed to an outer wall 56 of the container, such that these components are located outside of the container 50. Alternatively, the substrate 34, the electrodes 32 and/or the capacitive sensor 30 may be arranged and/or fixed to an inner wall 56 of the container 50, such that these components are located inside of the container 50 and/or in an interior volume of the container 50.

Further, the capacitive sensor 30 may be attached to the wall 56 by any suitable connection, such as e.g. a glue connection, a snap-fit, a weld connection or any other connection.

In the example shown in FIG. 1, the capacitive sensor 30 is covered by a protective cover 36. Between the protective cover 36 and the wall 56 of the container, a compartment 38 may be formed, in which the capacitive sensor 30, the electrodes 32 and/or the substrate 34 are arranged. Therein, edges and/or borders of the protective cover 36 may be attached to the wall 56 of the container 50, e.g. by glue connection and/or by an adhesive connection, such that the capacitive sensor 30 and its components are protected against environmental influences and/or such that the capacitive sensor 30 is fixedly and/or detachably attached to the wall 56.

As can be seen in FIG. 1, a length of the capacitive sensor 30, which may be measured parallel to the rotatable shaft 52 (and/or an extension direction thereof) may substantially correspond to a height of the container 50, which may also be measured parallel to the rotatable shaft 52 (and/or an extension direction thereof).

In order to determine and/or measure the capacitance in the vicinity of the one or more electrodes 32, the capacitive sensor 30 is electrically coupled to the control circuitry 14 via a sensor connector 40, which may e.g. be arranged adjacent the coupling section 12 on an inner or outer wall of the housing 11.

Further, the control circuitry 14 comprises a measurement circuitry 24, which may be arranged on the PCB 15, and which may be configured to determine one or more capacitance values for the capacitance(s) in the vicinity of the one or more of the electrodes 32. Therein, the measurement circuitry 24 may be configured to determine the capacitance value of an electrode 32 of the plurality of electrodes 32 based on applying a known charge to said electrode 32 and measuring a potential, based on applying a known potential to said electrode 32 and measuring a charge of the electrode 32 (e.g. based on integrating the current supplied to the electrode 32 over time), based on constructing an oscillating circuit comprising said electrode 32, whereby the frequency or resonance frequency of that circuit may depend on the capacitance value, and measuring the frequency or resonance frequency and/or whereby a correlation between current and voltage at a given frequency may depend on the capacitance value. In another example implementation, the measurement circuitry 24 may comprise a capacitance bridge (nor shown) configured to measure the capacitance value of said electrode 32.

The control circuitry 14 is configured to process the one or more sensor signals of the capacitive sensor 30 and to determine, based on the one or more sensor signals, one or more lubrication parameters indicative of the lubrication action. Therein, the one or more lubrication parameters may be one or more of an abnormal working condition of the lubricator 10 and/or the lubrication system 100, an abnormal working condition of the lubricant container 50, a (partial or complete) blockage of the output 55 of the lubricant container 50, an amount of lubricant 51 dispensed during at least a part of the lubrication action, an accumulated amount of lubricant 51 dispensed from the lubricant container 50 in a plurality of lubrication actions, an amount of lubricant 51 remaining in the lubricant container 50, a lubrication time period for the lubrication action, a lubrication frequency, and a time between consecutive lubrication actions. Also other lubrication parameters can be determined, such as e.g. a normal working condition of the lubricator 10 (and/or the lubrication system 100) and/or a start time for a subsequent lubrication action.

Moreover, the control circuitry 14 can compute the one or more of the lubrication parameters based on the one or more sensor signals and based on at least one container parameter which may be descriptive of at least one of a type of the lubricant container 50, a capacity of the lubricant container 50, a volume of the lubricant container 50, an initial volume of lubricant stored in the lubricant container 50, a geometry of the lubricant container 50, a height 31 of the lubricant container 50, and a diameter of at least a part of the lubricant container 50. Also the at least one container parameter can be stored in a data storage 23 of the lubricator 10 and/or the lubrication system 100. Alternatively or additionally, it can be retrieved and/or accessed by the control circuitry 14 via a communication circuitry 22 of the lubricator 10 and/or the lubrication system 100.

Further, the control circuitry 14 may be configured to monitor, based on the one or more sensor signals of the sensor 30, an amount of lubricant 51 dispensed from the lubricant container 50 in one or more lubrication actions, wherein the control circuitry 14 is configured to compare the determined amount of lubricant 51 dispensed in the one or more lubrication actions from the lubricant container 50 with at least one threshold value. Therein, the amount of lubricant 51 dispensed in a plurality of lubrication actions may refer to an accumulated and/or total amount of lubricant 51 dispensed from the container 50. In other words, the control circuitry 14 may be configured to monitor the amount of lubricant 51 dispensed in a single lubrication and/or dispensed in a plurality of lubrication actions. The one or more threshold values may e.g. be stored in the data storage 23 of the lubrication system 100. Alternatively or additionally, the one or more threshold values may be retrieved from another source, e.g. via a communication circuitry 22 of the lubrication system 100.

Optionally, the control circuitry 14 may be configured to stop the electric motor 16 when the determined amount of lubricant 51 dispensed from the lubricant container 50 in the one or more lubrication actions reaches or exceeds the at least one threshold value. For instance, the control circuitry may be configured to determine the amount of lubricant 51 dispensed during a single lubrication and compare the determined amount with a threshold value for the amount of lubricant 51 that should be dispensed per lubrication action and/or with a target amount of lubricant 51 that should be dispensed per lubrication action. When the control circuitry 14 determines that the amount of lubricant 51 dispensed in the lubrication action reaches or exceeds the threshold value for the amount of lubricant 51 that should be dispensed per lubrication action, the control circuitry 14 may stop the electric motor 16, such that the lubrication action is terminated. This may allow to ensure that the target amount of lubricant is indeed dispensed during the lubrication action, thereby ensuring sufficient and proper lubrication of the object. Optionally, a signal indicating that the target amount of lubricant has been dispensed may be triggered by the control circuitry 14 when the threshold value is reached or exceeded. The signal may e.g. be transmitted via a communication circuitry 22 of the lubrication system 100 and/or a corresponding information item may be displayed on an indicator 20 or display 20 of the lubrication system 100.

Alternatively or additionally, the control circuitry 14 may be configured to determine the amount of lubricant 51 dispensed during and/or in a plurality of lubrication actions and compare the determined amount with a threshold value for a maximum amount of lubricant 51 dispensable from the container 50. Therein, the maximum amount of lubricant 51 may substantially correspond to an initial volume or amount of lubricant 51 stored in the container 50. When the control circuitry 14 determines that the amount of lubricant 51 dispensed in the plurality of lubrication actions reaches or exceeds the threshold value for the maximum amount of lubricant 51, the control circuitry 14 may stop the electric motor 16 and/or may determine that the container 50 is nearly empty, close to empty and/or empty. This may allow for a reliable determination when the container 50 is empty. Also, by stopping the electric motor 16, it may be ensured that the electric motor 16 is not powered and/or driven, although the container 50 is empty. Optionally, a signal indicating that the container 50 is nearly empty, close to empty and/or empty may be triggered by the control circuitry 14 when the threshold value is reached or exceeded. The signal may e.g. be transmitted via a communication circuitry 22 of the lubrication system 100 and/or a corresponding information item may be displayed on an indicator 20 or display 20 of the lubrication system 100.

Further, the control circuitry 14 may be configured to compare the determined at least one lubrication parameter with a threshold value for the at least one lubrication parameter. Optionally, a signal and/or warning signal can be triggered and/or transmitted by the control circuitry 14 via the communication circuitry 22, when the control circuitry 14 determines that the threshold value for the at least one lubrication parameter is reached and/or exceeded.

The communication circuitry 22 of the lubricator 10 and/or the lubrication system 100 can be a wired communication circuitry or a wireless communication circuitry. The communication circuitry 22 can be integrated into the housing 11. Therein, the communication circuitry 22 can comprise a corresponding communication interface. For instance, a signal or warning signal can be transmitted by the control circuitry 14 via the communication circuitry.

Due to the fact that the lubricators 10 and/or lubrication systems 100 are often placed in a location with difficult access and it is not always possible to provide wires to them, the communication circuitry 22 used for transmission of the signal, warning signal and/or alarm message preferably is a wireless communication circuitry 22 (although not necessarily).

Also any other information, data and/or signals can be transmitted and/or received via the communication circuitry 22. For instance, such information, data and/or signals can relate to at least one parameter characterizing the power supply 18, at least one parameter characterizing the lubricator 10 and/or the lubrication system 100 and/or at least one parameter characterizing the object 102 and/or a machine on which the lubrication system 100 is mounted.

For example, the communication circuitry 22 can comprise a radio communication module, preferably enabling transmission over one or more wireless protocols, such as e.g. Bluetooth or W-Fi. This allows accessing the lubricator 10 and/or the lubrication system 100 with an external device like a smartphone or a laptop, or other external devices. Also, the communication circuitry 22 can communicate, for example, with a main MCU over HCI or UART interface, or it might be an MCU with integrated radio communication.

The lubricator 10 and/or the lubrication system 100 further comprises an indicator 20 and/or display 20 configured to display at least one information item, e.g. an information item related to the determined at least one lubrication parameter. For instance, if a blockage of the output 55 is detected and/or if the container 50 is empty, this may be indicated on indicator 20. It should be noted, however, that any other information item can be shown or displayed on the indicator 20, such as e.g. an amount of lubricant 51 currently stored in the container 50.

Figure 2:
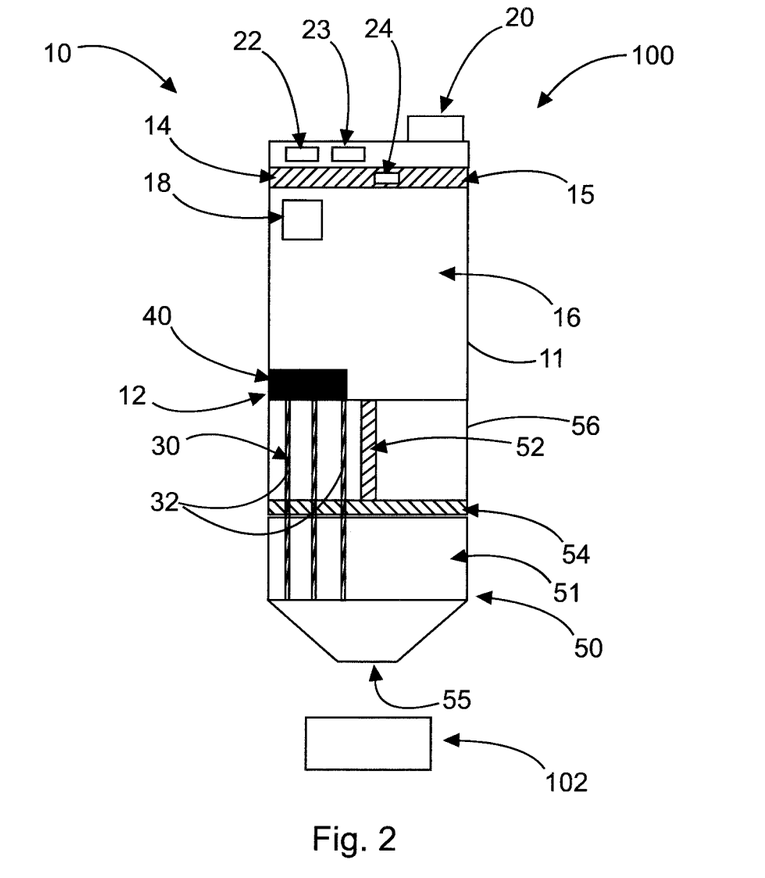
FIG. 2 shows a cross-sectional view of a lubrication system according to an exemplary embodiment.

FIG. 2 shows a cross-sectional view of a lubrication system 100 according to an exemplary embodiment. If not stated otherwise, the lubrication system 100 of FIG. 2 comprises the same features, functions and/or elements as the lubrication system 100 described with reference to FIG. 1.

In the example shown in FIG. 2, the at least one capacitive sensor 30 at least partly encompasses the container 50 at a perimeter of the container 51. For instance, the capacitive sensor 30 and/or the one or more electrodes 32 thereof may be arranged on an elastic substrate 34 or support 34 and/or the electrodes 32 may be interconnected by an elastic material 34. The capacitive sensor 30 may for instance be placed around the container 50, such that the sensor 30 at least partly or entirely encompasses and/or surrounds the container 50 along the perimeter and/or along a circumferential direction of the container 50. Due to an astringent force of the elastic substrate 34 or support 34 and/or the elastic material 34, the capacitive sensor 30 may be fixed and/or held in place on the container 50.

Accordingly, the elastic substrate 34, support 34 and/or the elastic material 34 interconnecting the electrodes 32 may act like a rubber-band, by means of which the capacitive sensor 30 can be arranged and/or fixed to the container 50 and/or the wall 56 of the container 50, in particular an outer wall of the container 50.

Figure 3:
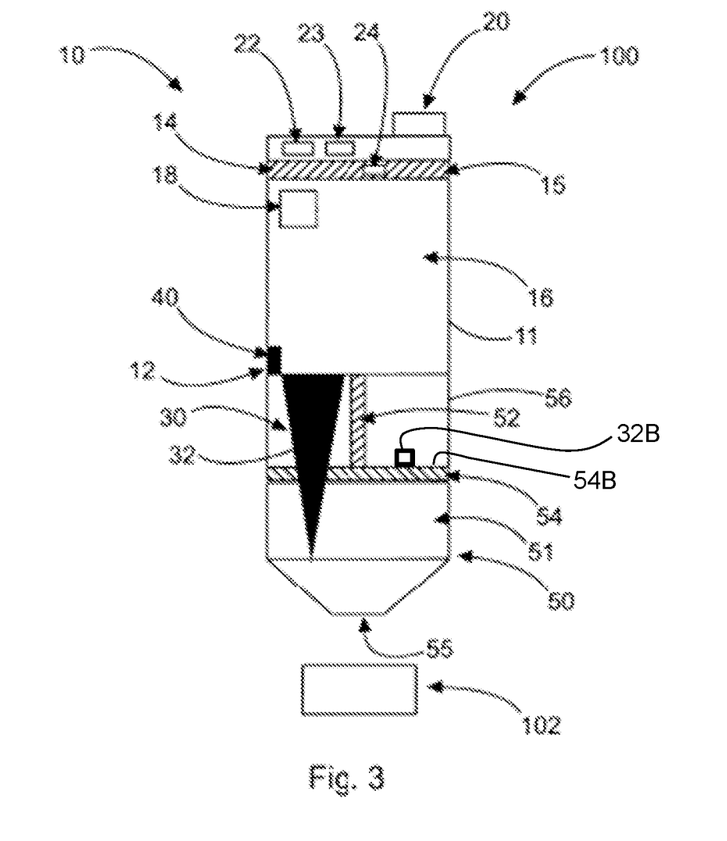
FIG. 3 shows a cross-sectional view of a lubrication system according to an exemplary embodiment.

FIG. 3 shows a cross-sectional view of a lubrication system 100 according to an exemplary embodiment. If not stated otherwise, the lubrication system 100 of FIG. 3 comprises the same features, functions and/or elements as the lubrication system 100 described with reference to previous figures.

The sensor 30 comprises an electrode 32, which may be arranged on the (inner or outer) wall 56 of the container 50 and may have a V-shape and/or a triangular shape, e.g. with the tip being directed towards the output 55 of the container 50. Optionally, a second electrode 32B may be mounted on a lateral surface 54B of the piston 54, as shown in FIG. 3 or may be formed and/or provided by the piston 54. When the piston 54 moves down, an active area of the first electrode 32 may change and by that the determined capacitance and/or capacitance value may change. This may allow to reliably detect the one or more lubrication parameters.

Figure 4:
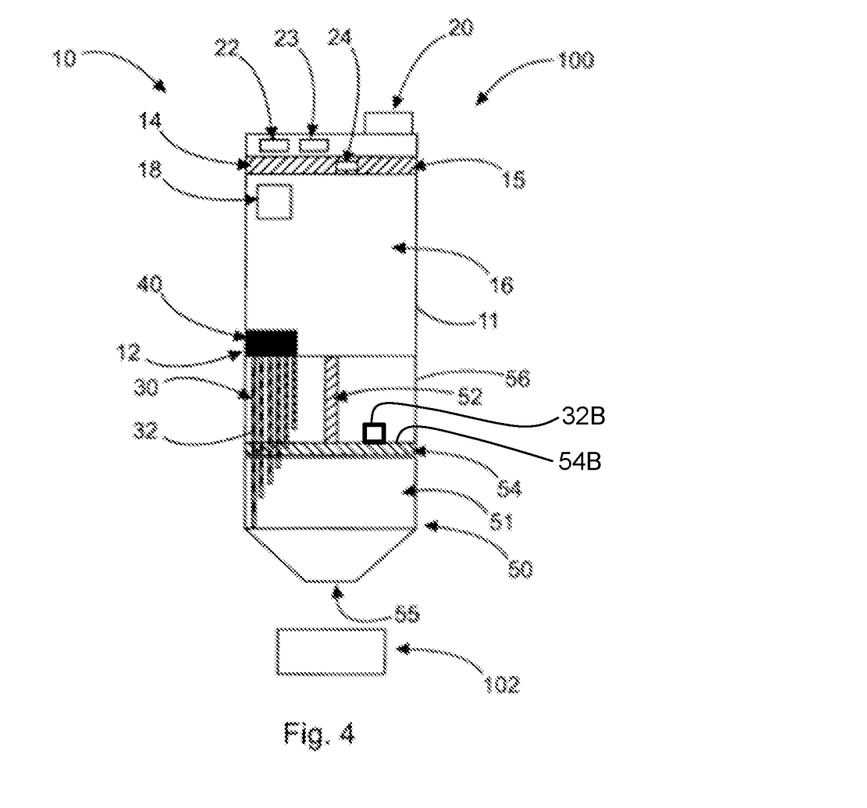
FIG. 4 shows a cross-sectional view of a lubrication system according to an exemplary embodiment.

FIG. 4 shows a cross-sectional view of a lubrication system 100 according to an exemplary embodiment. If not stated otherwise, the lubrication system 100 of FIG. 4 comprises the same features, functions and/or elements as the lubrication system 100 described with reference to previous figures.

In the example shown in FIG. 4, a plurality of electrodes 32 is arranged on the (outer or inner) wall 56 of the container 50, wherein each electrode 32 has a different length measured parallel to an extension direction of the shaft 52. The electrodes 32 are arranged, such that the ends of the electrodes 32, which are directed towards the output 55 of the container 50, are spaced apart from the output 55 by different distances.

Alternatively or additionally multiple electrodes 32 may be located at different positions along the length of the container 50, such that the ends of the multiple electrodes 32, which are directed towards the output 55 of the container 50, are spaced apart from the output 55 by different distances.

In either case, when the piston 54 moves down, the number of the electrodes 32 which are arranged opposite to the piston 54, and hence which see the piston 54 as second electrode 32B, may change. This may allow to reliably detect the one or more lubrication parameters. In some embodiments, the second electrode 32B may be mounted on a lateral surface 54B of the piston 54, as shown in FIG. 4 or may be formed and/or provided by the piston 54.

Figure 5:
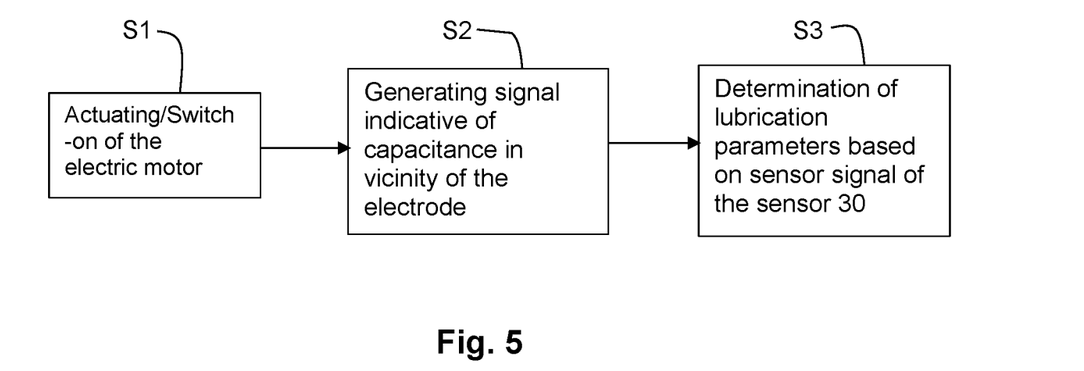
FIG. 5 shows a flowchart illustrating steps of a method of operating a lubrication system according to an exemplary embodiment.

FIG. 5 shows a flowchart illustrating steps of a method of operating a lubrication system 100 according to an exemplary embodiment. The method may likewise relate to a method of lubricating an object 102, e.g. using the lubrication system 100 as described with reference to previous figures.

In a first step S1, an electric motor 16 of the lubrication system 100 is actuated with a control circuitry 14 of the lubrication system 100 to drive, during at least one lubrication action, a rotatable shaft 52 of the lubricant container 50 and displace a piston 54 of the lubricant container 50 coupled to the rotatable shaft 52.

In a further step S2, at least one sensor signal indicative of a capacitance in a vicinity of at least one electrode 32 is generated with at least one capacitive sensor 30 including the at least one electrode 32, which sensor 30 is arranged at a wall 56 of the lubricant container 50.

In a further step S3, at least one lubrication parameter indicative of the at least one lubrication action is determined with the control circuitry 14 of the lubrication system 100 based on the at least one sensor signal of the at least one capacitive sensor 30.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

What is claimed is:

1. An automatic lubrication system for lubricating an object, the lubrication system comprising:
    a lubricant container configured to contain a lubricant and including a rotatable shaft with a piston to dispense the lubricant from an output of the lubricant container;
    a housing with a coupling section coupled with the lubricant container;
    an electric motor configured to drive the rotatable shaft of the lubricant container during at least one lubrication action, such that at least a part of the lubricant is dispensable from the lubricant container during the at least one lubrication action;
    at least one capacitive sensor including at least one electrode mounted on a wall of the lubricant container, wherein the at least one capacitive sensor is configured to provide at least one sensor signal; and a control circuitry configured to determine, based on the at least one sensor signal, at least one lubrication parameter indicative of the at least one lubrication action, wherein a second electrode is arranged within the lubricant container and is movable relative to the lubricant container, and wherein the at least one sensor signal is indicative of a capacitance between the at least one electrode and the second electrode.

2. The lubrication system according to claim 1, wherein the at least one lubrication parameter is indicative of at least one of:

an abnormal working condition of the lubrication system;
an abnormal working condition of the lubricant container;
a blockage of the output of the lubricant container;
an amount of lubricant dispensed during at least a part of the at least one lubrication action;
an accumulated amount of lubricant dispensed from the lubricant container in a plurality of lubrication actions;
an amount of lubricant remaining in the lubricant container;
a lubrication time period;
a lubrication frequency; and
a time between consecutive lubrication actions.

3. The lubrication system according to claim 2, wherein the control circuitry is further configured to determine the at least one lubrication parameter based on at least one container parameter, wherein the at least one container parameter is indicative of at least one of:

a type of the lubricant container;
a capacity of the lubricant container;
a volume of the lubricant container;
an initial volume of lubricant stored in the lubricant container;
a geometry of the lubricant container;
a shape of the lubricant container;
a height of the lubricant container; and
a diameter of at least a part of the lubricant container.

4. The lubrication system according to claim 2, further comprising a communication circuitry configured to transmit a signal indicative of the determined at least one lubrication parameter.

5. The lubrication system according to claim 4, wherein the control circuitry is further configured to compare the at least one lubrication parameter with a threshold value for the lubrication parameter, and
trigger transmission of the signal indicative of the determined at least one lubrication parameter via the communication circuitry, in response to the at least one lubrication parameter reaching or exceeding the threshold value.

6. The lubrication system according to claim 1, wherein the control circuitry is further configured to determine the at least one lubrication parameter based on at least one container parameter, wherein the at least one container parameter is indicative of at least one of:

a type of the lubricant container;
a capacity of the lubricant container;
a volume of the lubricant container;
an initial volume of lubricant stored in the lubricant container;
a geometry of the lubricant container;
a shape of the lubricant container;
a height of the lubricant container; and
a diameter of at least a part of the lubricant container.

7. The lubrication system according to claim 1, wherein the wall is an inner wall of the lubricant container.

8. The lubrication system according to claim 1, wherein the at least one capacitive sensor is a strip-like capacitive sensor extending substantially parallel to the rotatable shaft from an end of the housing towards the output of the lubricant container.

9. The lubrication system according to claim 1, wherein the at least one electrode has at least one of an irregular shape and a nonrectangular shape.

10. The lubrication system according to claim 1, wherein the at least one capacitive sensor is detachably attached to the wall of the lubricant container.

11. The lubrication system according to claim 1, wherein the at least one capacitive sensor at least partly encompasses the lubricant container at a perimeter of the lubricant container.

12. The lubrication system according to claim 1, further comprising:

a protection cover covering at least a part of the at least one capacitive sensor to protect the at least one capacitive sensor.

13. The lubrication system according to claim 12, wherein the protection cover entirely covers the at least one capacitive sensor to protect the at least one capacitive sensor.

14. The lubrication system according to claim 13, wherein at least a part of the protection cover is arranged at the wall of the lubricant container, such that a compartment is formed between the wall of the lubricant container and the protection cover, and
the at least one capacitive sensor is arranged in the compartment.

15. The lubrication system according to claim 12, wherein at least a part of the protection cover is arranged at the wall of the lubricant container, such that a compartment is formed between the wall of the lubricant container and the protection cover, and
the at least one capacitive sensor is arranged in the compartment formed between the wall of the lubricant container and the protection cover.

16. The lubrication system according to claim 1, further comprising:

a sensor connector arranged adjacent the coupling section of the housing at a wall of the housing,
wherein the at least one capacitive sensor is detachably coupled to the sensor connector.

17. The lubrication system according to claim 16, wherein the sensor connector is electrically coupled to the at least one capacitive sensor and to the control circuitry.

18. The lubrication system according to claim 1, wherein the control circuitry comprises a measurement circuitry configured to determine, based on the at least one sensor signal, a capacitance between the at least one electrode and the second electrode.

19. The lubrication system according to claim 18, wherein the measurement circuitry is arranged on or integrated in a printed circuit board of the control circuitry.

20. The lubrication system according to claim 1, wherein the second electrode is arranged on a lateral surface of the piston.

21. The lubrication system according to claim 1, wherein the at least one electrode comprises a plurality of electrodes.

22. The lubrication system according to claim 1, wherein the control circuitry is further configured to determine, based on the at least one sensor signal, an amount of lubricant contained in the lubricant container.

23. The lubrication system according to claim 1, wherein the control circuitry is further configured to
  determine, based on the at least one sensor signal, a first amount of lubricant contained in the lubricant container before performing the lubrication action and a second amount of lubricant contained in the lubricant container after performing a part of the lubrication action or the entire lubrication action, and
  determine an amount of lubricant dispensed from the lubricant container based on the determined first amount and the determined second amount.

24. The lubrication system according to claim 1, wherein the control circuitry is further configured to
  determine, based on the at least one sensor signal, an amount of lubricant dispensed from the lubricant container by the at least one lubrication action, and
  compare the determined amount of lubricant with a threshold value.

25. The lubrication system according to claim 24, wherein the control circuitry is further configured to stop the electric motor, in response to the determined amount of lubricant dispensed from the lubricant container being greater than or equal to the threshold value.

26. The lubrication system according to claim 25, wherein the threshold value is a threshold value for an amount of lubricant that should be dispensed per lubrication action or a threshold value for a maximum amount of lubricant dispensable from the lubricant container.

27. The lubrication system according to claim 25, wherein the control circuitry is further configured to determine, based on the at least one sensor signal, an amount of lubricant remaining in the lubricant container.

28. The lubrication system according to claim 24, wherein the threshold value is a threshold value for an amount of lubricant that should be dispensed per lubrication action or a threshold value for a maximum amount of lubricant dispensable from the lubricant container.

29. The lubrication system according to claim 24, wherein the control circuitry is further configured to determine, based on the at least one sensor signal, an amount of lubricant remaining in the lubricant container.

30. The lubrication system according to claim 1, further comprising a communication circuitry configured to transmit a signal indicative of the determined at least one lubrication parameter.

31. The lubrication system according to claim 30, wherein the control circuitry is further configured to
  compare the at least one lubrication parameter with a threshold value for the lubrication parameter, and
  trigger transmission of the signal indicative of the determined at least one lubrication parameter via the communication circuitry, in response to the at least one lubrication parameter reaching or exceeding the threshold value.

32. The automatic lubrication system of claim 1, wherein the second electrode is positioned on a lateral surface of the piston.

33. An automatic lubrication system for lubricating an object, the lubrication system comprising:
  a lubricant container configured to contain a lubricant and including a rotatable shaft with a piston moveably disposed in the lubricant container, the lubricant container comprising an upper part located on a first side of the piston and a lower discharge part located on a second side of the piston, the lower discharge part having an outlet to dispense the lubricant from the lubricant container;
  a housing with a coupling section coupled with the lubricant container;
  an electric motor configured to drive the rotatable shaft of the lubricant container during at least one lubrication action, such that at least a part of the lubricant is dispensable from the lubricant container during the at least one lubrication action;
  at least one capacitive sensor including at least one electrode, wherein the at least one capacitive sensor is arranged at a wall of the lubricant container, traversing the piston and configured to provide at least one sensor signal indicative of a capacitance in a vicinity of the at least one electrode, at least a portion of the at least one capacitive sensor being positioned in the lower discharge part; and
  a control circuitry configured to determine, based on the at least one sensor signal, at least one lubrication parameter indicative of the at least one lubrication action,
  wherein the at least one capacitive sensor comprises a plurality of electrodes, and
  wherein ends of the electrodes, which are directed towards an output of the lubricant container, are spaced apart from the output by different distances for each electrode.

34. A method of operating an automatic lubrication system, the method comprising:
  actuating, with a control circuitry of the lubrication system, an electric motor of the lubrication system to drive, during at least one lubrication action, a rotatable shaft of a lubricant container and to displace a piston in the lubricant container coupled to the rotatable shaft;
  generating, with at least one capacitive sensor comprising at least one electrode arranged at a wall of the lubricant container and a second electrode in communication with the piston, at least one sensor signal indicative of a capacitance in a vicinity of the at least one electrode and the second electrode; and
  determining, with the control circuitry of the lubrication system, at least one lubrication parameter indicative of the at least one lubrication action based on the at least one sensor signal.

* * * * *